US010424206B2

(12) United States Patent
Shenfeld et al.

(10) Patent No.: US 10,424,206 B2
(45) Date of Patent: Sep. 24, 2019

(54) AIRCRAFT COLLISION WARNING

(71) Applicant: ISRAEL AEROSPACE INDUSTRIES LTD., Lod (IL)

(72) Inventors: Uri Shenfeld, Rehovot (IL); Samuel Rosenfeld, Beit Gavriel (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 247 days.

(21) Appl. No.: 15/308,699

(22) PCT Filed: May 7, 2015

(86) PCT No.: PCT/IL2015/050476
§ 371 (c)(1),
(2) Date: Nov. 3, 2016

(87) PCT Pub. No.: WO2015/170329
PCT Pub. Date: Nov. 12, 2015

(65) Prior Publication Data
US 2017/0178516 A1    Jun. 22, 2017

(30) Foreign Application Priority Data
May 7, 2014    (IL) .......................................... 232484

(51) Int. Cl.
*G01S 5/18*    (2006.01)
*G01S 5/16*    (2006.01)
(Continued)

(52) U.S. Cl.
CPC .......... *G08G 5/0008* (2013.01); *G08G 5/0021* (2013.01); *G08G 5/0078* (2013.01); *G08G 5/045* (2013.01); *G01S 5/18* (2013.01)

(58) Field of Classification Search
CPC .... G08G 5/0008; G08G 5/0078; G08G 5/045; G08G 5/0021
(Continued)

(56) References Cited

U.S. PATENT DOCUMENTS 4,232,313 A  * 11/1980  Fleishman ............... G01S 13/79
                                                                342/31
4,755,818 A     7/1988  Conrad
(Continued)

FOREIGN PATENT DOCUMENTS

| JP | 3751021 B2 * | 3/2006 | ........... G01S 5/0009 |
| WO | 1988009027 A1 | 11/1988 | |
| WO | WO-9528650 A1 * | 10/1995 | ........... G01S 5/0009 |

OTHER PUBLICATIONS

Configuration selection for fusion of range and Doppler measurements from multistatic radars for air collision warning Wenbo Dou et al.2015 18th International Conference on Information Fusion (Fusion); Year: 2015 pp. 636-643 (Year: 2015).*
(Continued)

*Primary Examiner* — Cuong H Nguyen
(74) *Attorney, Agent, or Firm* — Dorsey & Whitney LLP (57) ABSTRACT

The presently disclosed subject matter includes a collision warning and avoidance system and method for detecting a collision risk between an interrogating aircraft and at least one interrogated aircraft. Signals received from the at least one interrogated aircraft or by the at least one interrogated aircraft and at least one other interrogating aircraft are used for determining various situation awareness data which is used for determining whether the interrogating aircraft is in a risk of collision. If indeed a collision risk exists a collision warning is generated, the collision warning including data indicative of at least an estimated location of the at least one interrogated aircraft.

30 Claims, 8 Drawing Sheets

(51) Int. Cl.
  *G08G 5/00* (2006.01)
  *G08G 5/04* (2006.01)
(58) Field of Classification Search
  USPC ............... 701/3, 301, 519; 342/29, 30, 453
  See application file for complete search history.

(56) References Cited

U.S. PATENT DOCUMENTS

| | | | | |
|---|---|---|---|---|
| 5,596,332 | A * | 1/1997 | Coles | G01S 5/0009 342/455 |
| 6,683,562 | B2 * | 1/2004 | Stayton | G08G 5/0008 340/945 |
| 6,744,396 | B2 * | 6/2004 | Stone | G08G 5/0008 340/945 |
| 6,789,016 | B2 * | 9/2004 | Bayh | G01S 13/765 342/176 |
| 6,911,936 | B2 * | 6/2005 | Stayton | G08G 5/0008 340/945 |
| 7,349,774 | B2 | 3/2008 | Werback | |
| 7,706,979 | B1 * | 4/2010 | Herwitz | G01S 13/003 701/301 |
| 7,777,675 | B2 * | 8/2010 | Smith | G01S 5/0027 342/456 |
| 8,232,911 | B1 * | 7/2012 | Pedersen | G01S 13/781 342/45 |
| 8,380,367 | B2 * | 2/2013 | Schultz | G01C 21/00 340/945 |
| 8,446,321 | B2 * | 5/2013 | Smith | G01S 5/0081 342/457 |
| 9,060,341 | B2 * | 6/2015 | Karr | G01S 1/026 |
| 9,237,543 | B2 * | 1/2016 | Karr | G01S 1/026 |
| 9,277,525 | B2 * | 3/2016 | Dupray | G01S 1/026 |
| 2003/0233192 | A1 * | 12/2003 | Bayh | G01S 13/765 701/301 |
| 2004/0174295 | A1 * | 9/2004 | Stayton | G08G 5/0008 342/182 |
| 2007/0247368 | A1 | 10/2007 | Wu | |
| 2010/0292871 | A1 * | 11/2010 | Schultz | G01C 21/00 701/3 |
| 2011/0057830 | A1 | 3/2011 | Sampigethaya et al. | |
| 2012/0041620 | A1 | 2/2012 | Stayton et al. | |

OTHER PUBLICATIONS

A Laser Obstacle Warning and Avoidance system for Manned and Unmanned Aircraft Roberto Sabatini et al.; 2014 IEEE Metrology for Aerospace (MetroAeroSpace); Year: 2014; pp. 616-621; IEEE Conferences. (Year: 2014).*

Design of SDCA using RSSI for mid-air collisions; T. M. Amirthalakshmi et al.; 2016 IEEE International Conference on Computational Intelligence and Computing Research (ICCIC); Year: 2016;; pp. 1-4; IEEE Conferences. (Year: 2016).*

International Search Report and Written Opinion dated Sep. 8, 2016 in PCT/IL2015/050476.

"Maximize the cost-effectiveness of training", Autonomous Air Combat Maneuvering Instrumentation (AACMI), 3 pages, Sep. 7, 2012.

* cited by examiner

AIRCRAFT COLLISION WARNING

FIELD OF THE PRESENTLY DISCLOSED SUBJECT MATTER

This invention relates to the field of aircraft collision alerts and avoidance.

BACKGROUND

Mid-air collisions between aircrafts represent a major risk in the aviation world. In order to reduce this risk, commercial aviation requires large aircrafts to be equipped with an airborne collision avoidance system (ACAS). One type of ACAS, which is commonly used by commercial aircrafts, is a Traffic Alert and Collision Avoidance system (TCAS). TCAS is based on interrogation of nearby aircraft transponders, which can then be localized relative to the interrogating aircraft based on the signals returned from the interrogated transponder.

When different aircrafts progress in conflicting routes, which expose the aircrafts to a risk of collision, the pilots of the aircrafts are provided with a collision warning by TCAS. In case of imminent collision, the system can also provide the aircrafts with maneuvering instructions (e.g. climb or descend instructions) directed for avoiding collision between the aircrafts.

GENERAL DESCRIPTION

According to one aspect of the presently disclosed subject matter there is provided a method of computerized method of collision risk detection between an interrogating aircraft and at least one interrogated aircraft; the method comprising:

receiving signals from the at least one other aircraft; processing signals and determining situation awareness data; determining at least a range between the interrogating aircraft and at least one interrogated aircraft;

performing at least one of the operations (a) and (b):

a) determining an interrogating circle around the interrogating aircraft; wherein the at least one other aircraft is located on the interrogating circle;

b) determining an interrogating sphere surrounding the interrogating aircraft; wherein the at least one other aircraft is located on the interrogating sphere;

and generating a collision warning, the collision warning including data indicative of at least an estimated location of the at least one interrogated aircraft.

In addition to the above features, the method according to this aspect of the presently disclosed subject matter can optionally comprise one or more of features (i) to (xiii) below, in any desired combination or permutation.

i). the computerized method further comprises: generating and transmitting interrogating signals; wherein the signals are generated by an aviation transponder onboard the at least one interrogated aircraft responsive to the interrogating signals.

ii). wherein the situation awareness data include closing velocity of the at least one interrogated aircraft.

iii). the computerized method further comprises: generating collision avoidance maneuvering instructions for guiding the interrogating aircraft for avoiding collision.

iv). the computerized method further comprises: after execution of a collision avoidance maneuver, generating maneuvering feedback indicating whether the collision avoidance maneuver has reduced collision risk.

v). the computerized method further comprises: obtaining, via a data link, situation awareness data with respect to the at least one interrogated aircraft from one or more other interrogating aircrafts;

determining enriched situation awareness data based on information obtained by the interrogating aircraft and the one or more other interrogating aircrafts; and generating the collision warning based on the enriched situation awareness data.

vi). wherein the enriched situation awareness data comprises information indicative of one or more other interrogating circles, each one of the one or more other interrogating circles encircling a respective aircraft from among the one or more other interrogating aircrafts; the computerized method comprising: determining one or more intersection points between the interrogating circle and the one or more other interrogating circles; wherein the interrogated aircraft is located at one of the intersection points.

vii). wherein the one or more other interrogating aircrafts include two or more other interrogating aircrafts, the computerized method comprising: determining an intersection point between the interrogating circle around the interrogating aircraft and at least two other interrogating circles, each one of the at least two other interrogating circles encircling a respective aircraft from among the two or more other interrogating aircrafts.

viii). wherein the enriched situation awareness data comprises information indicative of one or more other interrogating spheres, each one of the one or more other interrogating spheres surrounding a respective aircraft from among the one or more other interrogating aircrafts; the computerized method comprising: determining one or more intersection points between the interrogating sphere and the one or more other interrogating spheres; wherein the interrogating aircraft is located at one of the intersection points.

ix). wherein the at least one other interrogating aircraft includes only one other interrogating aircraft, the method comprising: determining an intersection between the interrogating sphere surrounding the interrogating aircraft and a respective interrogating sphere surrounding the one other interrogating aircraft; wherein the intersection is indicative of a circle and the interrogated aircraft is located on the circle.

x). wherein the at least one other interrogating aircraft includes two or more other interrogating aircrafts, the computerized method comprising: determining an intersection between the interrogating sphere surrounding the interrogating aircraft and at least two other interrogating spheres each surrounding a respective other interrogating aircraft.

xi). wherein the at least one other interrogating aircraft includes two other interrogating aircrafts and the intersection is indicative of two intersecting points, the interrogated aircraft is located on one of the two intersecting points.

xii). wherein the at least one other interrogating aircraft includes three other interrogating aircraft and the intersection is indicative of one intersecting point, the interrogated aircraft is located at the one intersecting point.

xiii). the computerized method comprising:

responsive to obtaining a first situation awareness data, generating a track file for tracking situation awareness data of a first interrogated aircraft;

responsive to obtaining a second situation awareness data, determining whether the first situation awareness data and the second situation awareness data correspond to the same interrogated aircraft;

if so, updating the first track file with the second situation awareness data; and, if not so, generating a second track file for tracking situation awareness data of a second interrogated aircraft.

According to another aspect of the presently disclosed subject matter there is provided a collision warning system for detection of collision risk between an interrogating aircraft and at least one interrogated aircraft, the system comprising:

a receiver, a processing unit and a collision warning unit; the receiver is configured to receive signals transmitted from the at least one interrogated aircraft;

the processing unit is configured to:

process the signals and determine situation awareness data; determine at least a range between the interrogating aircraft and at least one other aircraft;

perform at least one of the operations (a) and (b):

a) determining an interrogating circle around the interrogating aircraft; wherein the at least one interrogated aircraft is located on the interrogating circle;

b) determining an interrogating sphere surrounding the interrogating aircraft; wherein the at least one other aircraft is located on the interrogating sphere;

and the collision warning unit is configured to generate a collision warning, the collision warning including data indicative of at least an estimated location of the interrogated aircraft.

According to another aspect of the presently disclosed subject matter there is provided a non-transitory program storage device readable by machine, tangibly embodying a computer readable code portion executable by the machine to perform a method of collision risk detection between an interrogating aircraft and at least one interrogated aircraft; the method comprising:

receiving signals from the at least one other aircraft;

processing signals and determining situation awareness data;

determining at least a range between the interrogating aircraft and at least one interrogated aircraft;

performing at least one of the operations (a) and (b):

a) determining an interrogating circle around the interrogating aircraft; wherein the at least one other aircraft is located on the interrogating circle;

b) determining an interrogating sphere surrounding the interrogating aircraft; wherein the at least one other aircraft is located on the interrogating sphere;

and obtaining; via a friendly data link, situation awareness data with respect to the at least one other aircraft from one or more other interrogating aircrafts;

determining enriched situation awareness data based on information obtained by the interrogating aircraft and the one or more other interrogating aircrafts; and generating the collision warning based on the enriched situation awareness data, the collision warning including data indicative of at least an estimated location of the interrogated aircraft.

In addition to the above features, the system and the program storage device according to various aspects of the presently disclosed subject matter can optionally comprise one or more of features (i) to (xiii) listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 5 A and B show a schematic top view illustration of an example of two interrogating aircrafts with overlapping interrogation circles, in accordance with the presently disclosed subject matter;

FIG. 7 A shows a schematic illustration of an example of two interrogating aircrafts with respective overlapping interrogation spheres, in accordance with the presently disclosed subject matter;

FIG. 7 B shows a schematic illustration of an example of three interrogating aircrafts with respective overlapping interrogation spheres, in accordance with the presently disclosed subject matter.

DETAILED DESCRIPTION

In the drawings and descriptions set forth, identical reference numerals indicate those components that are common in different drawings. Elements in the drawings are not necessarily drawn to scale.

Unless specifically stated otherwise, as apparent from the following discussions, it is appreciated that throughout the specification discussions utilizing terms such as "connecting", "using", "handing over", "disconnecting", or the like, include action and/or processes of a computerized device that manipulate and/or transform data into other data, said data represented as physical quantities, e.g. such as electronic quantities, and/or said data representing the physical objects.

Collision warning system 120 described herein is a computerized device. The terms "computerized device", "computer", "processing unit" or any variation thereof should be expansively construed to cover any kind of electronic device with data processing capabilities, such as a processor (e.g. digital signal processor (DSP), microcontroller, field programmable circuit (ASIC), etc) or a device which comprises or is operatively connected to one or more computer processors including by way of non-limiting example, a personal computer, server, lap top computer, computing system, a communication device and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the claimed subject matter, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited. Numerous modifications, changes and improvements within the scope of the claimed subject matter will now occur to the reader.

The term "interrogating aircraft" is used herein to refer in general to an aircraft operating a collision warning system as disclosed herein. The term "interrogated aircraft" is used herein to refer in general to an aircraft which is in the vicinity of an interrogating aircraft and which may create a collision risk with the interrogating aircraft. For simplicity the above terms are used in general and should not be construed to imply that an interrogation signal has been necessary used.

Figure 1:
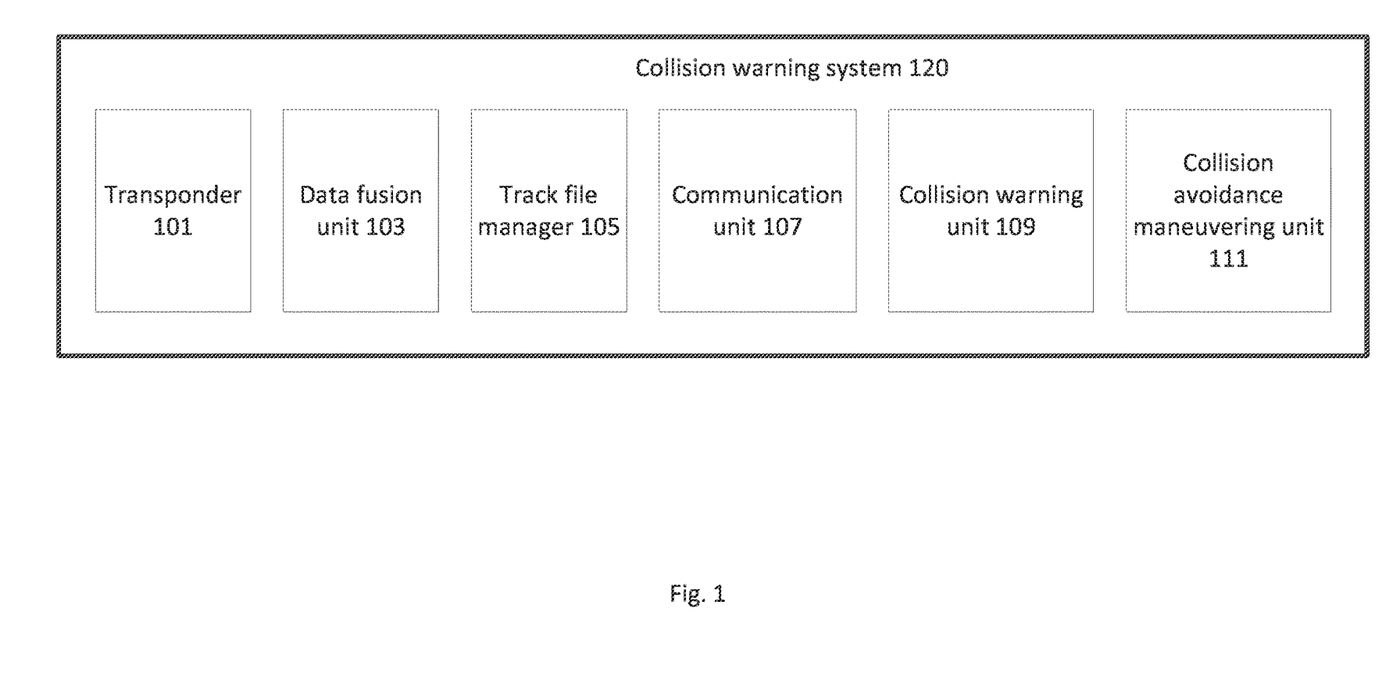
FIG. 1 is a functional block diagram illustrating an example of an onboard collision warning system, in accordance with the presently disclosed subject matter.
Figure 2:
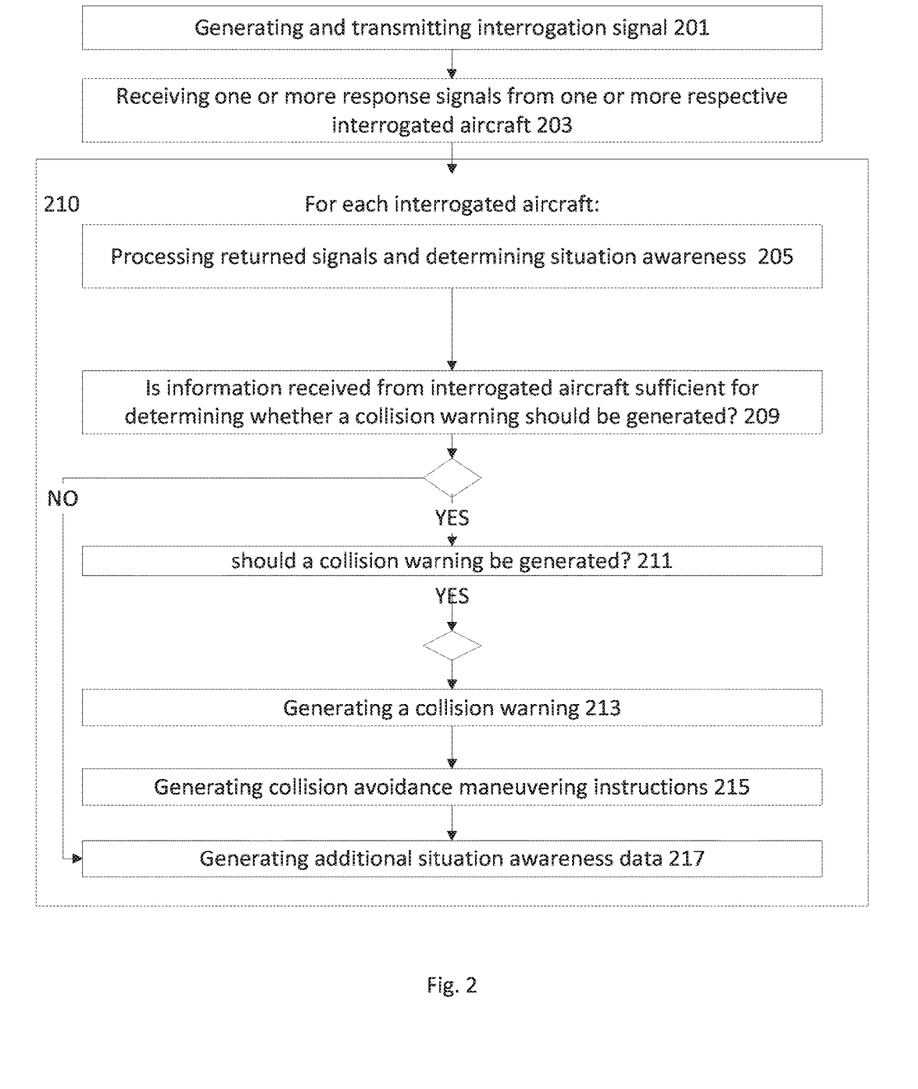
FIG. 2 is a flowchart showing an example of a sequence of operations, in accordance with the presently disclosed subject matter.
Figure 3:
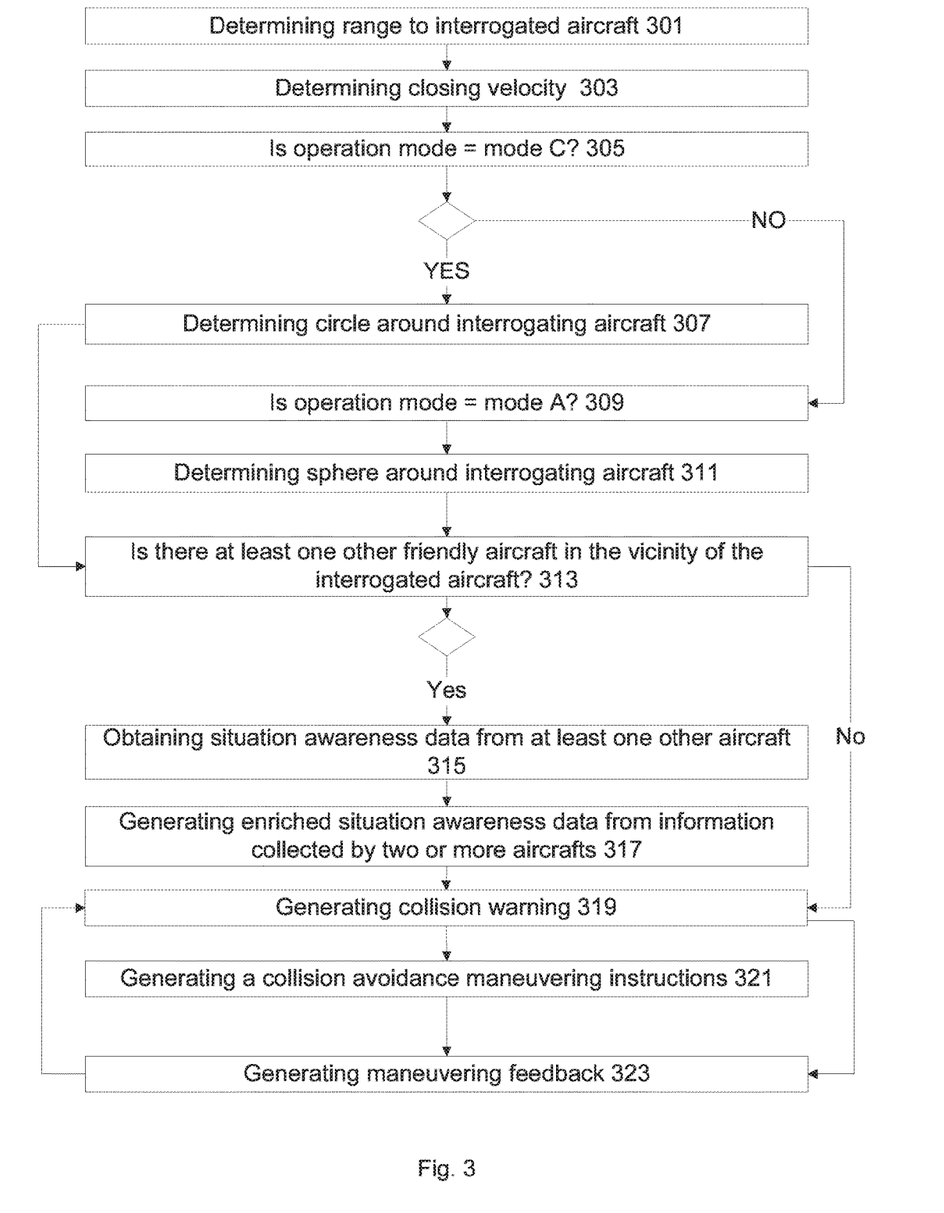
FIG. 3 is a flowchart showing an example of a sequence of operations, in accordance with the presently disclosed subject matter.

In embodiments of the claimed subject matter, fewer, more and/or different stages than those shown in FIG. 2 and FIG. 3 may be executed. In embodiments of the claimed subject matter one or more stages illustrated in FIG. 2 and FIG. 3 may be executed in a different order and/or one or more groups of stages may be executed simultaneously. FIG. 1 illustrates a schematic of the system architecture in accordance with embodiments of the presently disclosed subject matter. The modules in FIG. 1 may be centralized in one location or dispersed over more than one location. In other embodiments of the invention, the system may comprise fewer, more and/or different modules than those shown in FIG. 1.

Bearing the above in mind, attention is drawn to FIG. 1. which is a functional block diagram illustrating an example of an onboard collision avoidance system, in accordance with the presently disclosed subject matter. As mentioned above, Traffic Alert and Collision Avoidance systems (TCAS) are designed to be used by commercial aircrafts and general aviation. The size and weight of such systems is therefore adapted for commercial aircrafts and is thus inadequate for other types of aircrafts (such as small manned aircrafts, military aircrafts and unmanned aerial vehicles, both civilian and military) which have various constraints on the payload which they can carry.

Furthermore, the collision avoidance information generated by these systems (including collision warnings and collision avoidance maneuvering instructions) are based on the common flight characteristics of commercial aircrafts. In general, military aircrafts are characterized by flight patterns and maneuverability which are different to those of civil aviation. For example, fighter aircrafts fly fast and sometimes perform sharp maneuvers, helicopters hover in the air, fly sideways and in a vertical direction, Unmanned Aerial Vehicles often fly at low velocity, and sometimes maneuver slowly as well.

As a result, TCAS may generate false instructions to aircrafts such as military aircrafts carrying TCAS or to civil aviation that is about to collide with a military aircraft carrying TCAS. Therefore, collision avoidance information generated by TCAS is inadequate for aircrafts other than civil aviation aircrafts.

In addition, a TCAS onboard an aircraft operates with a bidirectional communication link exposed to any other aircrafts equipped with TCAS. Thus, a TCAS onboard a military aircraft would enable other aircrafts to track the military aircraft, which is undesirable for obvious reasons.

Military aircrafts are often equipped with other types of collision avoidance systems (such as "Ehud training kit" developed by Israel Aerospace Industries Ltd.) which are configured, inter alia, for providing collision avoidance warnings between different military aircrafts equipped with such systems.

Collision warning system 120 described herein is configured to take into account the unique flight profile of military aircraft to generate appropriate collision alert and maneuvering instructions (if generated). While a military aircraft equipped with system 120 is responsible for maneuvering out of a collision situation, a civil aircraft, which is in a collision risk with military aircraft, is not necessarily aware of the collision risk in real time.

Collision warning system 120 disclosed herein can be configured as a device located onboard an interrogating aircraft and can be configured to utilize the information obtained from an aviation transponder located onboard one or more nearby interrogated aircrafts for determining whether a collision risk exists between the interrogating and interrogated aircrafts. Collision warning system 120 can be further configured to determine collision avoidance information in case a collision risk is identified. The collision warning system can be used for example by civilian and military aircrafts, which do not carry TCAS, for avoiding collision with other aircrafts carrying a standard aviation transponder.

The term "aviation transponder device" as used herein includes any type of electronic device onboard an aircraft which produces a response when it receives an interrogation signal. One type of aviation transponder device is the friend or foe identification system (known as "identification, friend or foe", abbreviated IFF). IFF systems are identification systems located onboard military and civilian aircrafts, which enable other interrogating systems (including other aircrafts or secondary surveillance radars) to identify the aircraft carrying the IFF system.

Aviation transponder devices can operate in different interrogation modes (also known as "aviation transponder interrogation modes") where aviation transponder devices operating in different modes provide different information responsive to the interrogating signal. Communication protocols which have been standardized for civilian aviation include three different operation modes, mode S, mode C and mode A.

In mode S, in response to an interrogating signal, an aviation transponder device is woken up and transmits a signal comprising information ("situation awareness data") with respect to the interrogated aircraft. The information provided by a transponder device, when operating in mode S, enables the interrogating device to determine, inter alia, the position, velocity and heading of the interrogated aircraft.

The information provided by an aviation transponder device system when operating in mode C includes data indicative of the altitude of the interrogated aircraft while the information provided by an aviation transponder device when operating in mode A (3/A) includes only some identification of the interrogated aircraft. Information provided in mode A (e.g. 4 digit aircraft code) does not necessarily enable unique identification of an interrogated aircraft, as more than one aircraft may return identical information.

Collision warning system 120 is configured to determine and provide collision information based on response signals received from aviation transponder devices operating in any one of the interrogating modes.

Furthermore, collision warning system 120 can be configured to generate alerts based on data received from aircrafts transmitting Automatic Dependant Surveillance-Broadcast (ADS-B). ADS-B is a cooperative surveillance technology for tracking aircraft. The aircraft determines its own position via GNSS and periodically broadcasts this data via a radio frequency transmission. ADS-B does not require interrogation.

According to one example of the presently disclosed subject matter, collision warning system 120 can comprise transponder 101, data fusion unit 103, track file manager 105, communication unit 107, collision warning unit 109 and collision avoidance maneuvering unit 111.

Transponder 101 is configured to generate an interrogation signal and transmit the signal for interrogating aircrafts (referred to herein as "interrogated aircrafts") located within a certain range from the interrogating aircraft. Collision avoidance system can also comprise a receiver dedicated for receiving signals returned from different interrogated aircrafts as well as ADS-B transmissions.

Data fusion unit 103 is configured to process received signals and extract data transmitted by the signals. As explained below in more detail, data fusion unit 103 can be further configured to determine additional (enriched) situation awareness data which is not directly provided by the interrogated aircraft.

Track file manager 105 is configured to generate for each aircraft that has responded to the interrogating signal (or has transmitted situation awareness data independently by ADS-B) a respective track file for storing the available respective situation awareness data. As explained below, aircraft identification logic is implemented in order to identify and individually keep track of each interrogated aircraft.

In addition to the aircraft's identification data (i.e. data enabling to identify and keep track of each interrogated aircraft individually) a given track file comprises any additionally available situation awareness data with respect to the aircraft, whether extracted from the received signal or determined by data fusion unit 103 (including, for example, current altitude, velocity, heading and position).

Collision warning unit 107 is configured to determine, based on the situation awareness data of an interrogated aircraft and the situation awareness data of the interrogating aircraft, whether the two aircrafts are in risk of collision. If it is determined that a collision risk indeed exists, collision warning system is configured to generate a warning indicating the collision danger.

Collision warning system 120 can further comprise collision avoidance maneuvering unit 109 configured, in the event of a collision risk, to determine collision avoidance maneuvering instructions. The pilot (in case of a manned aircraft) or an operator (in case of an Unmanned Aerial vehicle) can execute the maneuvers in order to avoid collision. Collision warnings as well as collision avoidance maneuvering instructions can be provided for example as visual information on a display and/or as an audible alert and/or message. Collision avoidance maneuvering instructions can also be directly fed and executed by an autonomous flight control system operatively connected to collision warning system 120 and configured to autonomously guide the aircraft during flight (e.g. in an Unmanned Aerial Vehicle).

FIG. 2 is a flowchart illustrating an example of a sequence of operations which are performed, in accordance with the presently disclosed subject matter. Operations which are described with reference to FIG. 2 can be executed for example by collision warning system 120 described above with reference to FIG. 1.

At block 201 an interrogating signal is generated and transmitted (e.g. with the help of transponder 101). The interrogating signal can be transmitted for example, using a whisper and shout attenuation function which is intended to provide some selectivity as to which transponder-equipped aircraft respond to the interrogation signal. The whisper shout attenuation enables to reduce the number of replies received from the interrogating signal to avoid excessive RF replies (known as RF pollution).

At block 203 one or more response signals, returning from one or more interrogated aircrafts, are received. Returning signals from each interrogated aircraft are processed and situation awareness data is determined (block 205). As mentioned above, this can be accomplished for example by data fusion unit 103.

In addition, collision warning system 120 can be configured to receive and process signals generated and transmitted by automatic aircraft surveillance systems which are not dependent on interrogating signals such as ADS-B.

A respective track file can be generated (e.g. by track file manager 105) for each interrogated aircraft. Each track file can be identified and associated with a respective interrogated aircraft using identification data.

Signals returned from a given interrogated aircraft include in some cases identification data, identifying the respective aircraft. However, as explained above, this is not always the case. For instance, generally, aircrafts of the same type are identified by the same identifier, which can be thus used only to distinguish between aircraft of different types.

In order to distinguish between individual aircrafts, track file manager 105 can be configured to implement a tracking process based on obtained situation awareness data. A more detailed description of the tracking process is described below with reference to FIG. 8.

Any available situation awareness data of a given interrogated aircraft can be stored in a respective track file including for example, altitude, range, velocity, hearing, etc.

Collision warning system 120 can be configured to determine the mode of operation of the interrogated aircraft. If situation awareness data which is obtained from the signals returned by the aviation transponder onboard the interrogated aircraft is sufficient for assessing whether a collision risk exists (block 209), collision warning system 120 utilizes the received information to determine whether a collision warning should be generated or not (block 211).

For example, if the interrogated aircraft comprises an aviation transponder device operating in mode S, the information which is provided by the interrogated aircraft includes data which is sufficient for determining the position, velocity and bearing of the interrogated aircraft. Collision warning system 120 (e.g. with the help of data fusion unit 103) can compare this information to the position, velocity and bearing of the interrogating aircraft and determine whether the interrogating aircraft and interrogating aircraft are at risk of colliding.

If it is determined that a collision risk between the interrogating and interrogated aircraft indeed exists, collision warning system 120 (e.g. with the help of collision warning unit 109) generates a collision warning (block 213) for warning a pilot or operator of the danger of collision. A collision warning can be provided as a "time to collision" and/or "distance to collision" indication.

For example, there may be three levels of collision alerts, including: "initial alert", "danger" which is based on time and "immediate danger" which is based on distance and closing speed. For instance, when two aircrafts are flying in substantially parallel progression routes, the distance between the aircraft may be dangerously short while the time to collision is quite long. In such cases, the immediate danger alert can be activated, regardless of the estimated time to collision.

Furthermore, collision warning system 120 can be also configured to generate collision avoidance maneuvering instructions (block 215) directed for guiding the interrogating aircraft away from the progression route of the interrogated aircraft and outside the collision danger zone.

If at block 209 it is determined that the information provided by the aviation transponder onboard the interrogated aircraft is insufficient for determining whether a collision warning should be generated, collision warning system 120 is configured to generate enriched situation awareness data 217.

FIG. 3 is a flowchart illustrating an example of a sequence of operations which are performed for obtaining additional (enriched) situation awareness data, in accordance with the presently disclosed subject matter. FIG. 3 provides a more detailed description of block 217 in FIG. 2.

The range to the interrogated aircraft and its closing velocity can be determined based on the interrogating signal generated and transmitted by collision warning system 120.

At block 301 the range between the interrogating aircraft and the interrogated aircraft is determined. This can be accomplished for example based on time of flight of the interrogating signal. The interrogating signal can be repeatedly transmitted and processed in order to calculate speed, closing velocity and maintain updated situation awareness data as the two aircraft progress in the sky. At block 303 the closing velocity of the interrogated aircraft is determined. The velocity and closing velocity can be determined using various methods which are known per se. The closing velocity indicates whether the interrogated aircraft is flying in the direction of the interrogating aircraft or flying away from the interrogating aircraft.

If the closing velocity is negative, then there is no risk of collision and therefore no alert will be generated, unless the aircraft is in very close proximity (close proximity is a predefined parameter indicating an immediate danger of collision and can be set to equal a certain value). Data fusion unit 103 can be configured to determine the range and closing velocity.

If the operation mode of the aviation transponder system onboard the interrogated aircraft is mode C (block 305), this means that the altitude of the interrogated aircraft is available from the returned signal. Accordingly, a circle (referred herein also as "interrogating circle") around the interrogating aircraft is determined (block 307), where the altitude of the circle is the altitude of the interrogated aircraft and the radius of the circle equals to the range of the interrogating aircraft from the interrogated aircraft. Since the position of the interrogated aircraft is unknown, it can be located anywhere on the circumference of the interrogating circle.

If the operation mode of the aviation transponder device onboard the interrogated aircraft is mode A (block 309), this means that the altitude of the interrogated aircraft is unavailable. Accordingly, a sphere (referred to herein also as an "interrogating sphere") around the interrogating aircraft is determined, where the radius of the sphere equals to the range of the interrogating aircraft from the interrogated aircraft. Since neither the position nor the altitude of the interrogated aircraft is known, it can be located anywhere on the surface of the interrogating sphere surrounding the interrogating aircraft.

At block 313 it is determined whether there is at least one other friendly aircraft in the vicinity of the interrogating aircraft which identifies the same interrogated aircraft. A friendly aircraft can be any aircraft with an open communication link to the interrogating aircraft and which is equipped with a collision avoidance system operating based on similar principles to the collision warning system 120 disclosed herein.

If no other friendly aircraft is identified, collision warning system is configured to generate a collision warning based on the available situation awareness data (block 319). If the altitude of the interrogated aircraft is known, the collision warning can include an indication of the altitude of the interrogated aircraft and its range from the interrogating aircraft. For example, collision warning system 120 can comprise or be operatively connected to a display which can be used to show a graphical illustration of the interrogating aircraft and the surrounding area where the interrogated aircraft may be present.

Figure 4:
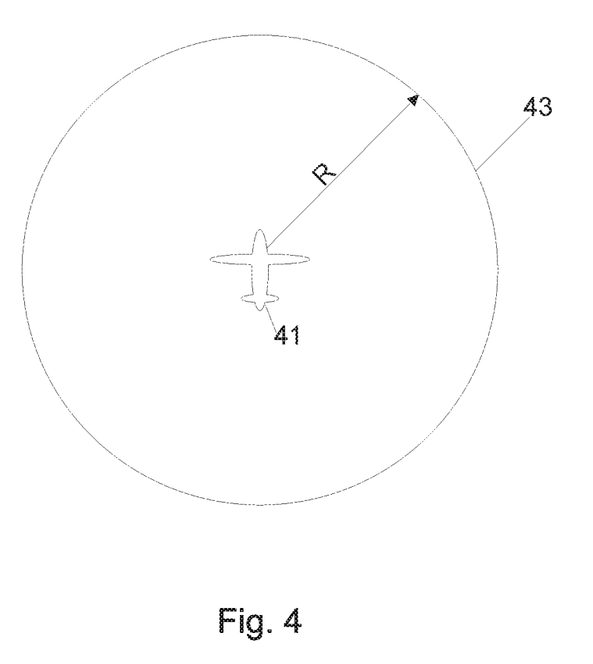
FIG. 4 shows a schematic top view illustration of an example of an interrogating aircraft at the center of a circle of an interrogation circle, in accordance with the presently disclosed subject matter.

FIG. 4 shows a schematic top view illustration of an example of an interrogating aircraft 41 at the center of an interrogation circle 43. The interrogated aircraft is located on some point along circle 43. Similarly the area around the interrogating aircraft can be indicated as a sphere (e.g. in a three dimensional image) if the altitude of the interrogated aircraft is unavailable.

At block 321 collision avoidance maneuvering instructions are generated (e.g. by unit 111). Collision avoidance maneuvering instructions may not always be generated. For example, this may be the case if the available situation awareness data is limited to the range of the interrogated aircraft. If the altitude of the interrogated aircraft is available, the collision avoidance maneuvering instructions may include a maneuver directed for guiding the interrogating aircraft to an altitude which provides safe altitude separation between the interrogating and interrogated aircrafts.

Collision warning system 120 can be further configured to generate a maneuvering feedback (block 323) indicating whether the risk of collision with the interrogated aircraft has been reduced as a result of the maneuver. The feedback can be provided to a pilot, an operator or be fed to an autonomous flight control system. System 120 can be configured, responsive to the generated feedback, to determine whether a different maneuver (possibly in opposite directions) should be carried out to avoid collision. Maneuvering feedback can be provided for example by unit 111.

For example, in the event that only the range to the interrogated aircraft is available, the pilot does not know the direction from which the interrogated aircraft is approaching, nor its altitude. Accordingly, the pilot may accidently maneuver the aircraft towards the approaching interrogated aircraft and thus increase the risk of collision. The maneuvering feedback notifies the pilot that an additional corrective maneuver should be made to avoid collision. Furthermore, collision warning system 120 can be configured to determine whether the time to collision has become shorter as a result of the maneuver and generate an alert if it has.

Reverting to block 313, in the event that at least one other friendly aircraft is identified in the vicinity of the interrogating aircraft, collision warning system 120 is configured to obtain situation awareness data from the at least one other friendly aircraft (block 315). To this end, collision warning system 120 can comprise communication module 105, configured to establish a communication link with other friendly aircrafts and receive situation awareness data of commonly interrogated aircrafts.

According to the presently disclosed subject matter; collision warning system 120 onboard one aircraft can be configured to obtain situation awareness data from one or more other interrogating aircrafts and use this data for determining additional (enriched) situation awareness data with respect to the interrogated aircraft (block 317).

Each friendly aircraft generates its own situation awareness data picture by interrogating its surroundings, as well as by reception of ADS-B transmissions. By sharing information between friendly aircrafts, each aircraft receives additional information that is used for reducing the number of potential locations of the interrogated aircraft or finding the exact 3 dimensional location of the interrogated aircraft if enough friendly aircrafts are available as described hereunder.

For example, assuming two aircrafts are flying together (e.g. two military aircrafts flying in a formation) and the aviation transponder onboard an interrogated aircraft is operating in mode C, collision warning system 120 on each one of the two aircrafts can determine a circle around the respective interrogating aircraft. Each aircraft obtains information with respect to the position of the other aircraft and the circle around the aircraft where the interrogated aircraft is located. Collision warning system 120 (e.g. with the help of data fusion unit 103) can be configured to determine two intersection points of the two circles where the interrogated aircraft may be located.

Figure 5A:
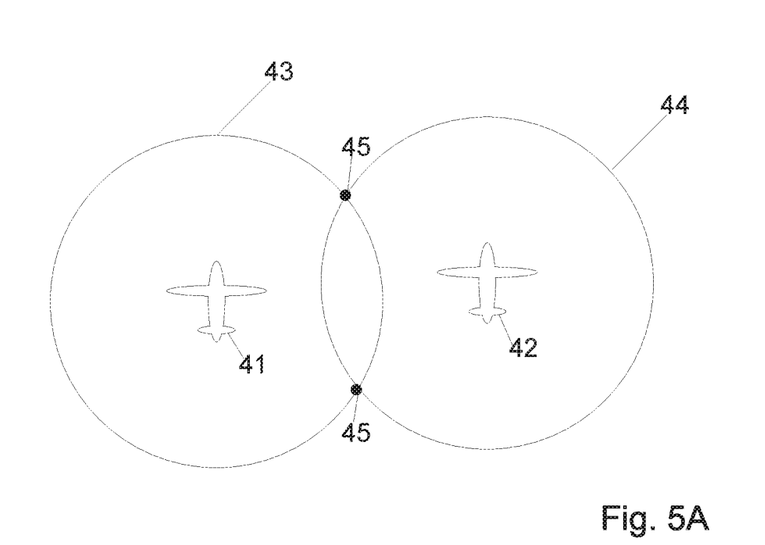

FIG. 5A shows a schematic top view illustration of an example of two interrogating aircrafts (41, 42) with overlapping interrogation circles (43 and 44 respectively). The interrogated aircraft is located at one of the intersection points 45 and 46.

Figure 5B:
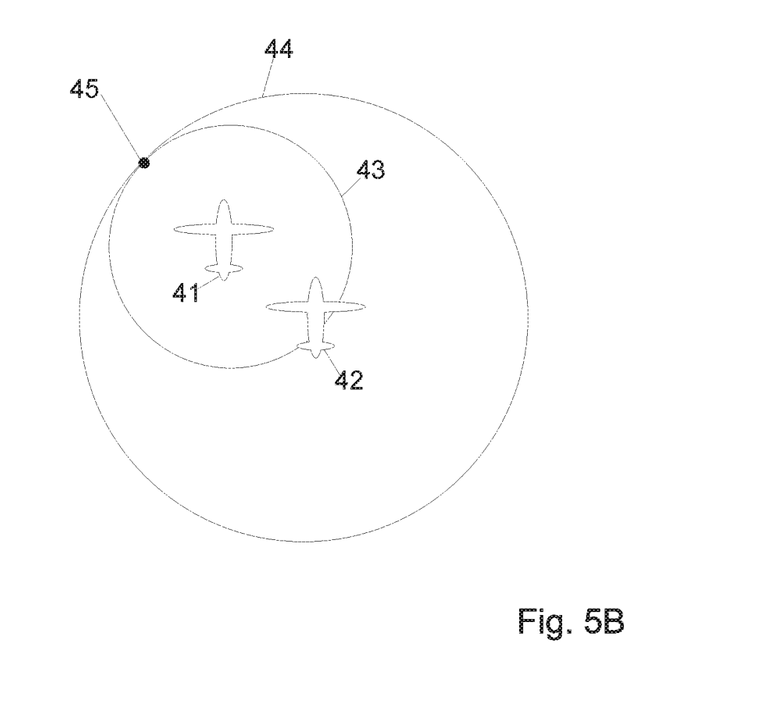

FIG. 5B shows another schematic top view illustration of an example of two interrogating aircrafts (41, 42) with overlapping interrogation circles (43 and 44 respectively). Different to the previous example, here the interrogated aircraft is located to the left of both interrogating aircrafts, and accordingly its location is at the intersection point 45 between the two interrogating circlers 43, 44.

Figure 6:
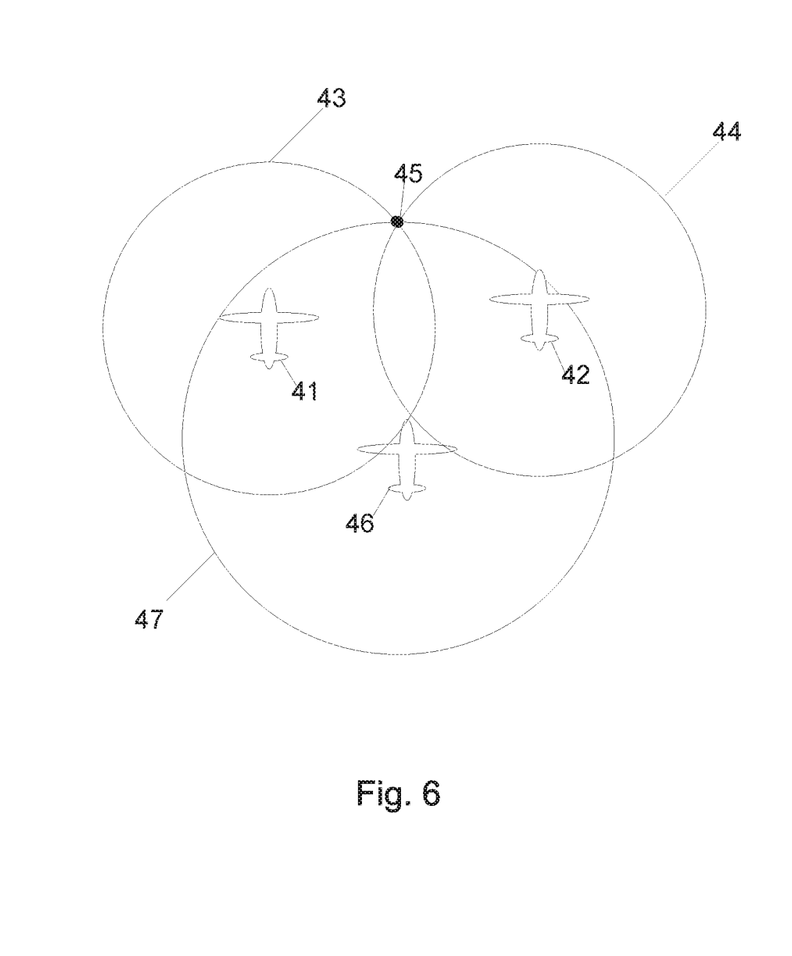
FIG. 6 shows a schematic top view illustration of an example of three interrogating aircrafts with overlapping interrogation circles, in accordance with the presently disclosed subject matter.

If there are three or more friendly aircrafts, a single intersection point of the three respective circles identifies the position of the interrogated aircraft. FIG. 6 shows a schematic top view illustration of an example of three interrogating aircrafts (41, 42, 46) with overlapping interrogation circles (43 and 44 and 47 respectively). The interrogated aircraft is located at the intersection point 45 between the three interrogating circlers 43, 44, 47.

Data fusion unit 103 can be configured to obtain the information from one or more other friendly aircrafts and generate enriched situation awareness data indicative of the position of the interrogated aircraft, based on fusion of situation awareness data from multiple aircrafts.

Figure 7A:
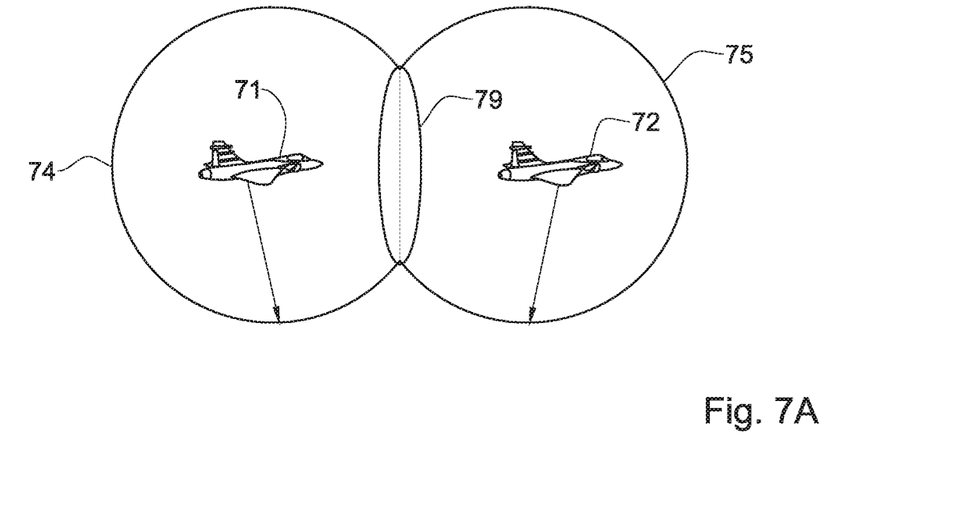

Similarly, if the aviation transponder onboard an interrogated aircraft is operating in mode A, collision warning system 120 on each one of the two aircraft can determine a sphere surrounding a respective aircraft. FIG. 7A shows a schematic illustration of a first interrogating aircraft 71 at the center of interrogating sphere 74 and a second interrogating aircraft 72 at the center of interrogating sphere 75. The intersection between the spheres creates a circle 79 on which the interrogated aircraft is located.

Figure 7B:
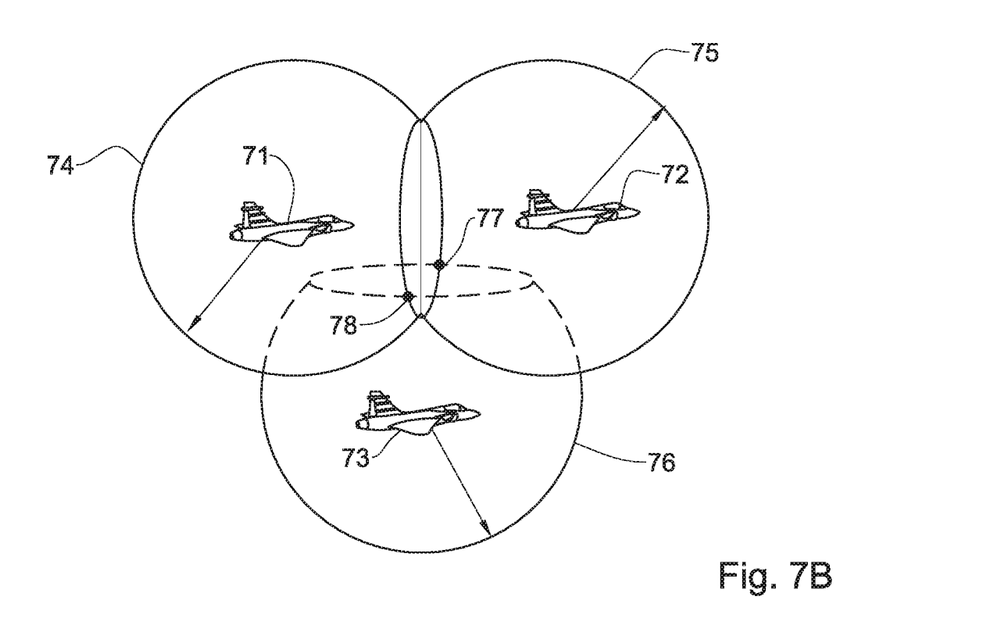

FIG. 7B shows a schematic illustration of a first interrogating aircraft 71 at the center of interrogating sphere 74 and a second interrogating aircraft 72 at the center of interrogating sphere 75 and a third aircraft 73 at the center of interrogating sphere 76. The intersection between the three spheres indicates two points 77 and 78 on which the interrogated aircraft can be located. If situation awareness data from a fourth aircraft is available, a single point indicating the location of the interrogated aircraft can be determined. Additional friendly interrogating aircraft can help in obtaining more accurate location data of the interrogated aircraft.

Based on the available information, a respective collision warning is generated comprising information indicative of the at least one estimated location of the interrogated aircraft (block 319). For example, if situation awareness data from two aircraft is available, and assuming the aviation transponder on the interrogated aircraft is operating in mode C, the collision warning can include an indication of the two possible locations of the interrogated aircraft. Alternatively, the collision warning can include more general information indicating the general direction of the interrogated aircraft (e.g. "aircraft at 3 o'clock" etc.). If situation awareness data from three aircrafts is available, the collision warning can include a more accurate indication of the location of the interrogated aircraft.

As explained above, based on the available situation awareness data, respective collision avoidance maneuvering instructions can be generated (block 321). In response to the executed maneuver and its effect on the collision risk, collision avoidance system can be configured to provide feedback to the pilot (block 323).

Figure 8:
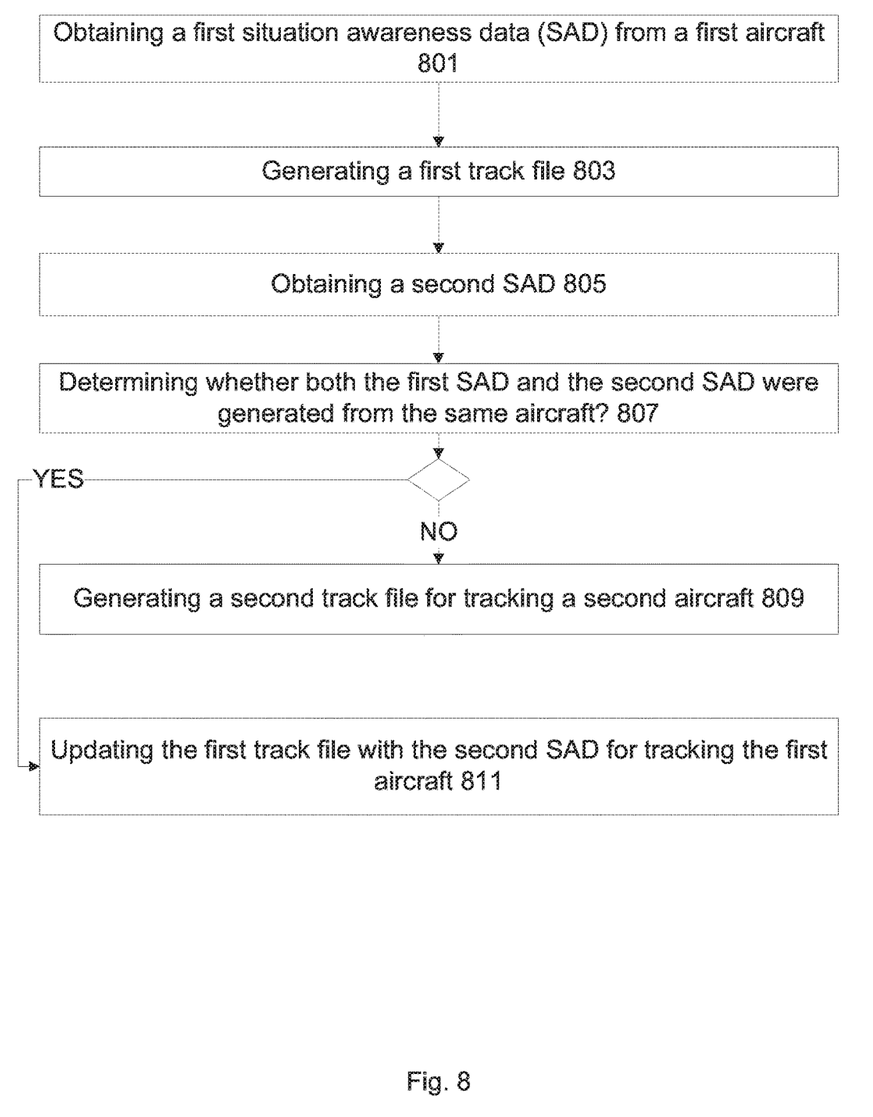
FIG. 8 is a flowchart showing an example of sequence of operations, in accordance with the presently disclosed subject matter.

Turning now to FIG. 8 which is a flowchart showing an example of a sequence of operations executed as part of tracking process, in accordance with the presently disclosed subject matter. Operations described with reference to FIG. 8 can be executed by collision warning system 120 (e.g. by data fusion unit 103 and track file manager 105).

As situation awareness data is being extracted from received signals, track file manager 105 can be configured to determine, based on changes in the obtained situation awareness data, whether received data should be associated with the same interrogated aircraft or a different interrogated aircraft.

For example, at block 801 a first instance of received signals from a first interrogated aircraft occurs and a first situation awareness data is obtained. As explained above, a respective track file is generated for storing and tracking the first interrogated aircraft (block 803).

After a certain time period, system 120 receives additional signals and determines a second situation awareness data (block 805). At block 807 it is determined whether the first situation awareness data and the second situation awareness data may have been generated by the same aircraft. This can be accomplished, for example, based on the time interval between signal reception of the first situation awareness data and the signal reception of the second situation awareness data and on the first and second situation awareness data.

Assuming, for example, that situation awareness data includes the range and velocity of the interrogated aircraft, it can be determined whether the difference between the range value in the first situation awareness data and the range value in the second situation awareness data can be generated by the same aircraft, considering the respective velocity.

If situation awareness data includes additional information (e.g. altitude) with respect to the interrogated aircraft, this information can also be used for determining whether the first and second situation awareness data were both generated by the same aircraft.

If it is determined that both the first and second situation awareness data may have been generated by the same interrogated aircraft, the first track file is updated with the newly obtained situation awareness data, to maintain track of the first aircraft (block 811). If it is determined that the first and second situation awareness data may not have been generated by the same interrogated aircraft, a new track file is generated for tracking a second aircraft (block 809).

The operations described above with respect to FIG. 8 can be repeated as information is being received at system 120 and thus allow to continuously track specific interrogated aircrafts.

It is noted that collision warning system 120 disclosed herein can provide collision avoidance information with respect to multiple aircrafts simultaneously. To this end, system 120 is configured to identify all possible aircrafts which pose a potential collision risk and deal with the aircrafts according to risk priority. Risk priority is defined according to risk of collision which is determined by system 120 (e.g. based on the respective range and velocity of the different interrogated aircrafts).

The presently disclosed subject matter contemplates a computer program implemented on a non-transitory computer useable medium being readable by a computer for executing the method of the presently disclosed subject matter. The presently disclosed subject matter further contemplates a machine-readable non-transitory computer memory tangibly embodying a program of instructions executable by the machine for executing the method of the presently disclosed subject matter.

The term "non-transitory" is used herein to exclude transitory, propagating signals, but to otherwise include any non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A system for detection of collision risk between an interrogating aircraft and at least one interrogated aircraft, the system comprising:
   a receiver configured to receive signals transmitted from the at least one interrogated aircraft;
   a collision warning unit; and
   a processing unit configured to:
   process signals and determine situation awareness data, the situation awareness data including at least a range between the interrogating aircraft and at least one other aircraft;
   perform at least one of operations (a) or (b):
   a) determining an interrogating circle around the interrogating aircraft; wherein the at least one interrogated aircraft is located on the interrogating circle;
   b) determining an interrogating sphere surrounding the interrogating aircraft; wherein the at least one interrogated aircraft is located on the interrogating sphere;
   generate a track file for tracking situation awareness data of a first interrogated aircraft, responsive to obtaining a first situation awareness data;
   responsive to obtaining a second situation awareness data, determining whether the first situation awareness data and the second situation awareness data corresponds to the same interrogated aircraft;
   if the first situation awareness data and the second situation awareness data corresponds to the same interrogated aircraft, update the first track file with the second situation awareness data; and
   if the first situation awareness data and the second situation awareness data does not correspond to the same interrogated aircraft, generate a second track file for tracking situation awareness data of a second interrogated aircraft; and
   wherein the collision warning unit is configured to generate a collision warning, the collision warning including data indicative of at least one estimated location of the interrogated aircraft.

2. The system according to claim 1, further comprising a transponder configured to generate and transmit interrogating signals and receive the signals, the signals are generated by an aviation transponder onboard the at least one interrogated aircraft in response to the interrogating signals.

3. The system according to claim 1 wherein the situation awareness data includes closing velocity of the at least one interrogated aircraft.

4. The system according to claim 1 wherein:
   the obtained situation awareness data is indicative of one or more other interrogating circles, each of the one or more other interrogating circles encircling a respective aircraft from among the one or more other interrogating aircraft; and
   the processing unit is configured to determine one or more intersection points between the interrogating circle and the one or more other interrogating circles, wherein the interrogated aircraft is located at one of the intersection points.

5. The system according to claim 4 wherein:
   the obtained situation awareness data is indicative of two or more other interrogating circles; and
   the processing unit is configured to determine an intersection point between the interrogating circle around the interrogating aircraft and at least two other interrogating circles, each encircling a respective other interrogating aircraft.

6. The system according to claim 1 wherein:
   the obtained situation awareness data is indicative of two or more other interrogating spheres, each one of the two or more other interrogating spheres surrounding a respective aircraft from among the one or more other interrogating aircraft; and
   the processing unit is configured to determine an intersection between the interrogating sphere surrounding the interrogating aircraft and at least two other interrogating spheres each surrounding a respective other interrogating aircraft.

7. The system according to claim 6 wherein the obtained situation awareness data is indicative of three or more other interrogating spheres, and the intersection is indicative of one intersecting point, the interrogated aircraft being located at the one intersecting point.

8. A system for detection of collision risk between an interrogating aircraft and at least one interrogated aircraft, the system comprising:
- a receiver configured to receive signals transmitted from the at least one interrogated aircraft;
- a collision warning unit;
- a processing unit configured to:
  - process signals and determine situation awareness data, the situation awareness data including at least a range between the interrogating aircraft and at least one other aircraft;
  - perform at least one of operations (a) or (b):
    - a) determining an interrogating circle around the interrogating aircraft; wherein the at least one interrogated aircraft is located on the interrogating circle;
    - b) determining an interrogating sphere surrounding the interrogating aircraft; wherein the at least one interrogated aircraft is located on the interrogating sphere; and
- a communication unit configured to communicate with one or more other interrogating aircraft and obtain situation awareness data with respect to the at least one interrogated aircraft from the one or more other interrogating aircraft, the obtained situation awareness data includes information indicative of one other interrogating sphere, the one other interrogating sphere surrounding a respective aircraft from among the one or more other interrogating aircraft;
- wherein the processing unit is further configured to:
  - determine enriched situation awareness data based on situation awareness data obtained by the interrogating aircraft and the one or more other interrogating aircraft, the enriched situation data includes an intersection between the interrogating sphere surrounding the interrogating aircraft and a respective interrogating sphere surrounding the one other interrogating aircraft, wherein the intersection is indicative of a circle and the interrogated aircraft is located on the circle; and
- wherein the collision warning unit is configured to generate a collision warning based on the enriched situation awareness data, the collision warning including data indicative of at least one estimated location of the interrogated aircraft.

9. The system according to claim 8, further comprising a transponder configured to generate and transmit interrogating signals and receive the signals, the signals are generated by an aviation transponder onboard the at least one interrogated aircraft in response to the interrogating signals.

10. The system according to claim 8 wherein the situation awareness data includes closing velocity of the at least one interrogated aircraft.

11. The system according to claim 8 wherein:
- the obtained situation awareness data is indicative of one or more other interrogating circles, each of the one or more other interrogating circles encircling a respective aircraft from among the one or more other interrogating aircraft; and
- the processing unit is configured to determine one or more intersection points between the interrogating circle and the one or more other interrogating circles, wherein the interrogated aircraft is located at one of the intersection points.

12. The system according to claim 11 wherein:
- the obtained situation awareness data is indicative of two or more other interrogating circles; and
- the processing unit is configured to determine an intersection point between the interrogating circle around the interrogating aircraft and at least two other interrogating circles, each encircling a respective other interrogating aircraft.

13. The system according to claim 8 wherein:
- the obtained situation awareness data is indicative of two or more other interrogating spheres, each one of the two or more other interrogating spheres surrounding a respective aircraft from among the one or more other interrogating aircraft; and
- the processing unit is configured to determine an intersection between the interrogating sphere surrounding the interrogating aircraft and at least two other interrogating spheres each surrounding a respective other interrogating aircraft.

14. The system according to claim 13 wherein the obtained situation awareness data is indicative of three or more other interrogating spheres, and the intersection is indicative of one intersecting point, the interrogated aircraft being located at the one intersecting point.

15. A computerized method of collision risk detection between an interrogating aircraft and at least one interrogated aircraft, the computerized method comprising:
- receiving signals from the at least one interrogated aircraft;
- processing the signals and determining situation awareness data, the situation awareness data including at least a range between the interrogating aircraft and at least one interrogated aircraft;
- performing at least one of operations (a) or (b):
  - a) determining an interrogating circle around the interrogating aircraft, wherein the at least one interrogated aircraft is located on the interrogating circle;
  - b) determining an interrogating sphere surrounding the interrogating aircraft, wherein the at least one interrogated aircraft is located on the interrogating sphere;
- obtaining situation awareness data with respect to the at least one interrogated aircraft from one or more other interrogating aircraft, the obtained situation awareness data being indicative of one other interrogating sphere, the one other interrogating sphere surrounding a respective aircraft from among the one or more other interrogating aircraft;
- determining enriched situation awareness data based on information obtained by the interrogating aircraft and the one or more other interrogating aircraft, wherein determining enriched situation awareness data includes determining an intersection between the interrogating sphere surrounding the interrogating aircraft and a respective interrogating sphere surrounding the one other interrogating aircraft, wherein the intersection is indicative of a circle and the interrogated aircraft is located on the circle; and
- generating a collision warning based on the enriched situation awareness data, the collision warning including data indicative of at least an estimated location of the at least one interrogated aircraft.

16. The computerized method according to claim 15, further comprising:
- generating and transmitting interrogating signals;
- wherein the interrogating signals are generated at the at least one interrogated aircraft responsive to the interrogating signals.

17. The computerized method according to claim 15 wherein the situation awareness data includes closing velocity of the at least one interrogated aircraft.

18. The computerized method according to claim 15 wherein:
   the obtained situation awareness data is indicative of one or more other interrogating circles, each of the one or more other interrogating circles encircling a respective aircraft from among the one or more other interrogating aircraft; and
   determining enriched situation awareness data includes determining one or more intersection points between the interrogating circle and the one or more other interrogating circles, wherein the interrogated aircraft is located at one of the intersection points.

19. The computerized method according to claim 18 wherein:
   the obtained situation awareness data is indicative of two or more other interrogating circles; and
   determining enriched situation awareness data includes determining an intersection point between the interrogating circle around the interrogating aircraft and at least two other interrogating circles, each of the at least two other interrogating circles encircling a respective aircraft from among the two or more other interrogating aircraft.

20. The computerized method according to claim 15 wherein:
   obtained situation awareness data is indicative of two or more other interrogating spheres, each of the two or more other interrogating spheres surrounding a respective aircraft from among the one or more other interrogating aircraft; and
   determining enriched situation awareness data includes determining an intersection between the interrogating sphere surrounding the interrogating aircraft and at least two other interrogating spheres the intersection being indicative of at least one intersecting point, wherein the interrogated aircraft is located at an intersecting point.

21. The computerized method according to claim 20 wherein the obtained situation awareness data is indicative of three or more other interrogating spheres, and the intersection is indicative of one intersecting point, the interrogated aircraft being located at the one intersecting point.

22. A non-transitory program storage device readable by machine, tangibly embodying a computer readable code portion executable by the machine to perform a method of collision risk detection between an interrogating aircraft and at least one interrogated aircraft, the method comprising:
   receiving signals from the at least one other aircraft;
   processing the signals determining situation awareness data; the situation awareness data includes at least a range between the interrogating aircraft and at least one interrogated aircraft;
   performing at least one of operations (a) or (b):
      a) determining an interrogating circle around the interrogating aircraft; wherein the at least one interrogated aircraft is located on the interrogating circle;
      b) determining an interrogating sphere surrounding the interrogating aircraft; wherein the at least one interrogated aircraft is located on the interrogating sphere;
   obtaining, via a friendly data link, situation awareness data with respect to the at least one other aircraft from one or more other interrogating aircraft, the obtained situation awareness data being indicative of one other interrogating sphere, the one other interrogating sphere surrounding a respective aircraft from among the one or more other interrogating aircraft;
   determining enriched situation awareness data based on information obtained by the interrogating aircraft and the one or more other interrogating aircraft, wherein determining enriched situation awareness data includes determining an intersection between the interrogating sphere surrounding the interrogating aircraft and a respective interrogating sphere surrounding the one other interrogating aircraft, wherein the intersection is indicative of a circle and the interrogated aircraft is located on the circle; and
   generating a collision warning based on the enriched situation awareness data, the collision warning including data indicative of at least one estimated location of the interrogated aircraft.

23. A non-transitory program storage device readable by machine, tangibly embodying a computer readable code portion executable by the machine to perform a method of collision risk detection between an interrogating aircraft and at least one interrogated aircraft, the method comprising:
   receiving signals from the at least one other aircraft;
   processing the signals determining situation awareness data; the situation awareness data includes at least a range between the interrogating aircraft and at least one interrogated aircraft;
   performing at least one of operations (a) or (b):
      a) determining an interrogating circle around the interrogating aircraft; wherein the at least one interrogated aircraft is located on the interrogating circle;
      b) determining an interrogating sphere surrounding the interrogating aircraft; wherein the at least one interrogated aircraft is located on the interrogating sphere;
   obtaining, via a friendly data link, situation awareness data with respect to the at least one other aircraft from one or more other interrogating aircraft;
   determining enriched situation awareness data based on information obtained by the interrogating aircraft and the one or more other interrogating aircraft;
   responsive to obtaining a first situation awareness data, generating a track file for tracking situation awareness data of a first interrogated aircraft;
   responsive to obtaining a second situation awareness data, determining whether the first situation awareness data and the second situation awareness data corresponds to the same interrogated aircraft;
   if the first situation awareness data and the second situation awareness data corresponds to the same interrogated aircraft, updating the first track file with the second situation awareness data;
   if the first situation awareness data and the second situation awareness data does not correspond to the same interrogated aircraft, generating a second track file for tracking situation awareness data of a second interrogated aircraft; and
   generating a collision warning, the collision warning including data indicative of at least one estimated location of the at least one interrogated aircraft.

24. A computerized method of collision risk detection between an interrogating aircraft and at least one interrogated aircraft, the computerized method comprising:
   receiving signals from the at least one interrogated aircraft;
   processing the signals and determining situation awareness data, the situation awareness data including at least a range between the interrogating aircraft and at least one interrogated aircraft;

performing at least one of operations (a) or (b):
   a) determining an interrogating circle around the interrogating aircraft, wherein the at least one interrogated aircraft is located on the interrogating circle;
   b) determining an interrogating sphere surrounding the interrogating aircraft, wherein the at least one interrogated aircraft is located on the interrogating sphere;

responsive to obtaining a first situation awareness data, generating a track file for tracking situation awareness data of a first interrogated aircraft;

responsive to obtaining a second situation awareness data, determining whether the first situation awareness data and the second situation awareness data corresponds to the same interrogated aircraft;

if the first situation awareness data and the second situation awareness data corresponds to the same interrogated aircraft, updating the first track file with the second situation awareness data; and if the first situation awareness data and the second situation awareness data does not correspond to the same interrogated aircraft, generating a second track file for tracking situation awareness data of a second interrogated aircraft; and generating a collision warning, the collision warning including data indicative of at least an estimated location of the at least one interrogated aircraft.

25. The computerized method according to claim 24 wherein:
   obtained situation awareness data is indicative of two or more other interrogating spheres, each of the two or more other interrogating spheres surrounding a respective aircraft from among the one or more other interrogating aircraft; and
   determining enriched situation awareness data includes determining an intersection between the interrogating sphere surrounding the interrogating aircraft and at least two other interrogating spheres the intersection being indicative of at least one intersecting point, wherein the interrogated aircraft is located at an intersecting point.

26. The computerized method according to claim 25 wherein the obtained situation awareness data is indicative of three or more other interrogating spheres, and the intersection is indicative of one intersecting point, the interrogated aircraft being located at the one intersecting point.

27. The computerized method according to claim 24, further comprising:
   generating and transmitting interrogating signals;
   wherein the interrogating signals are generated at the at least one interrogated aircraft responsive to the interrogating signals.

28. The computerized method according to claim 24 wherein the situation awareness data includes closing velocity of the at least one interrogated aircraft.

29. The computerized method according to claim 24 wherein:
   the obtained situation awareness data is indicative of one or more other interrogating circles, each of the one or more other interrogating circles encircling a respective aircraft from among the one or more other interrogating aircraft; and
   determining enriched situation awareness data includes determining one or more intersection points between the interrogating circle and the one or more other interrogating circles, wherein the interrogated aircraft is located at one of the intersection points.

30. The computerized method according to claim 29 wherein:
   the obtained situation awareness data is indicative of two or more other interrogating circles; and
   determining enriched situation awareness data includes determining an intersection point between the interrogating circle around the interrogating aircraft and at least two other interrogating circles, each of the at least two other interrogating circles encircling a respective aircraft from among the two or more other interrogating aircraft.

* * * * *